US007647307B2

(12) United States Patent
Rowley et al.

(10) Patent No.: US 7,647,307 B2
(45) Date of Patent: Jan. 12, 2010

(54) REVERSE ATTRIBUTE POINTERS (75) Inventors: Peter A. Rowley, Ben Lomond, CA (US); Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 11/591,975

(22) Filed: Nov. 1, 2006

(65) Prior Publication Data

US 2008/0104029 A1    May 1, 2008

(51) Int. Cl.
G06F 7/00     (2006.01)
G06F 17/30    (2006.01)
(52) U.S. Cl. .............................................. 707/3; 707/2
(58) Field of Classification Search ................. 707/102, 707/104.1, 3, 100, 1, 2
See application file for complete search history.

(56) References Cited

U.S. PATENT DOCUMENTS

| 6,374,253 | B1 | 4/2002 | Weider et al. |
| 6,490,589 | B1* | 12/2002 | Weider et al. ............... 707/100 |
| 6,539,379 | B1 | 3/2003 | Vora |
| 6,768,988 | B2 | 7/2004 | Boreham et al. |
| 6,785,686 | B2 | 8/2004 | Boreham et al. |
| 6,990,495 | B1 | 1/2006 | Grason et al. |
| 7,016,893 | B2* | 3/2006 | Boreham et al. ............... 707/3 |
| 7,016,907 | B2 | 3/2006 | Boreham et al. |
| 7,020,662 | B2 | 3/2006 | Boreham et al. |
| 7,130,839 | B2 | 10/2006 | Boreham et al. |
| 7,188,094 | B2* | 3/2007 | Excoffier et al. ............... 707/1 |
| 2001/0037339 | A1* | 11/2001 | Harvey ........................ 707/102 |
| 2002/0078005 | A1* | 6/2002 | Shi et al. ........................ 707/1 |
| 2002/0184380 | A1 | 12/2002 | Weider et al. |
| 2003/0037044 | A1 | 2/2003 | Boreham et al. |
| 2003/0055917 | A1 | 3/2003 | Boreham et al. |
| 2003/0061347 | A1 | 3/2003 | Boreham et al. |
| 2003/0078937 | A1 | 4/2003 | Boreham et al. |
| 2003/0078995 | A1 | 4/2003 | Boreham et al. |
| 2003/0084069 | A1 | 5/2003 | Boreham et al. |
| 2003/0088678 | A1* | 5/2003 | Boreham et al. ............ 709/228 |
| 2003/0105733 | A1 | 6/2003 | Boreham et al. |
| 2003/0105742 | A1 | 6/2003 | Boreham et al. |
| 2003/0115196 | A1 | 6/2003 | Boreham et al. |
| 2003/0135491 | A1 | 7/2003 | Rowley |
| 2003/0145074 | A1 | 7/2003 | Penick |
| 2003/0191757 | A1* | 10/2003 | Ambrosini et al. ............. 707/3 |
| 2004/0078368 | A1 | 4/2004 | Excoffier et al. |
| 2004/0078391 | A1* | 4/2004 | Excoffier et al. ......... 707/104.1 |

(Continued)

OTHER PUBLICATIONS

Office Action dated Jan. 23, 2009 for application No. 11/591,791 8 pgs.

(Continued)

Primary Examiner—Shahid A Alam
Assistant Examiner—Giovanna Colan
(74) Attorney, Agent, or Firm—Blakely, Sokoloff, Taylor & Zafman LLP (57) ABSTRACT Values for virtual reverse attributes are generated for distinguished name entries in a lightweight directory access protocol directory by navigating through a list of distinguished name values for an input virtual recursive attribute. An attribute list of the values for the virtual reverse attributes may be cached or indexed. In another aspect, the list of distinguished name values for the inputer virtual recursive attribute is generated.

24 Claims, 10 Drawing Sheets

U.S. PATENT DOCUMENTS

2004/0215642 A1* 10/2004 Cameron et al. ............ 707/100
2005/0021498 A1* 1/2005 Boreham et al. ................ 707/1
2005/0216485 A1* 9/2005 Bell et al. .................. 707/100
2005/0289174 A1 12/2005 Kolli et al.
2006/0020585 A1* 1/2006 Harvey et al. .................. 707/3
2006/0173873 A1* 8/2006 Prompt et al. ............... 707/100
2008/0046445 A1* 2/2008 Passey et al. ................ 707/100

OTHER PUBLICATIONS

Office Action dated May 29, 2009 for application No. 11/591,791 8 pgs.

* cited by examiner

REVERSE ATTRIBUTE POINTERS

RELATED APPLICATIONS

The present application is related to co-filed U.S. patent application Ser. No. 11/592,105 entitled "Extension of Organizational Chart Dynamic Group Lists Based on LDAP Lookups", Ser. No. 11/591,777 entitled "Deriving Cross-Relational Relationships from LDAP Source Data", Ser. No. 11/591,791 entitled "Nested Queries with Index" and Ser. No. 11/591,727 entitled "Dynamic Views based on LDAP", all of which are assigned to the assignee of the present application.

FIELD OF THE INVENTION

This invention relates generally to network directory services, and more particularly to Lightweight Directory Access Protocol directories.

BACKGROUND OF THE INVENTION

Lightweight Directory Access Protocol (LDAP) is a networking protocol for TCP/IP network directory services. An LDAP directory typically is represented as a hierarchical tree of entries, each of which consists of a set of named attributes with values. Each entry has a unique identifier known as a Distinguished Name (DN), which consists of a set of attributes and the DN of its parent entry, if any. The set of attributes is referred to as the entry's Relative Distinguished Name (RDN). Each attribute consists of a "name:value" pair and some attributes may be multivalued. Thus, the entry for Jane Smith who works for John Doe in the Sample company may be represented as a string:

dn: cn=Jane Smith, dc=sample, dc=com
manager: cn=John Doe, dc=sample, dc=com
mail: jane.smith@sample.com where dn is the name of the entry, "cn=Jane Smth" is the entry's RDN and "dc=sample, dc=com" is the DN of the parent entry. The other lines show the attributes in the entry. Attribute names are typically mnemonic strings, like "cn" for common name, "dc" for domain component, and "mail" for e-mail address. The attributes for a DN are defined as objects in an LDAP schema. A Directory Information Tree (DIT) defines the logical structure of the hierarchy Each LDAP server in a network commonly stores a directory subtree rooted at a specific entry, e.g. "dc=sample, dc=com" and will return results of queries on that subtree to the requesting client. An LDAP server may also hold references to other LDAP servers, so that a query on the "ou=Engineering, dc=sample, dc=com" would cause the server to return to the client a reference to another LDAP server that stores that part of the directory tree. Alternatively, an LDAP server may be configured to pass the query onto the appropriate server and then return the result to the client.

DETAILED DESCRIPTION OF THE INVENTION

Values for virtual reverse attributes are generated for distinguished name entries in a lightweight directory access protocol directory by navigating through a list of distinguished name values for an input virtual recursive attribute. An attribute list of the values for the virtual reverse attributes may be cached or indexed. In another aspect, the list of distinguished name values for the input virtual recursive attribute is generated.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described with reference to FIG. 1. An LDAP directory server 101 couples to a client computer 105 through a network 103 to perform directory queries on an LDAP database 107. The LDAP directory server 101 may contain a server front-end responsible for network communications, plugins for server functions (such as access control and replication), a basic directory tree containing server-related data, and a database back-end plugin responsible for managing the storage and retrieval of LDAP repository data. The client computer 105 may be, for example, a personal computer (PC), a mobile phone, a palm-sized computing device, a personal digital assistant (PDA), a network infrastructure component, such as a router, etc. In one embodiment, the client computer 105 communicates with the LDAP directory server 101 via a web server (not shown). For example, the client computer 105 may host a web browser that communicates with the web server using HTTP to request information. The web server may then communicate with the LDAP directory server 101 using LDAP to retrieve requested information from the LDAP database 107. Alternatively, the client computer 105 communicates directly with the LDAP directory server 101 using LDAP to request information stored in the LDAP database 107.

The queries are processed by an LDAP service module 111. A view service module 109 generates and maintains views that filter entries retrieved by a query to the LDAP directory 107. The filtered results may be presented to the client 105 in a graphical representation. The directory server 101 also includes a virtual attributes subsystem 113, which creates and maintains virtual attributes for DN entries in the LDAP directory 107 through a set of virtual attribute service provider modules 115. Each virtual attribute service provider module is responsible for at least one of the virtual attributes and may generate a virtual attribute index 117 to aid in searching the virtual attributes. In one embodiment, each entry in a virtual attribute index 117 contains a unique value for the corresponding attribute and a list of DN values that are associated with that unique value.

Figure 2A:
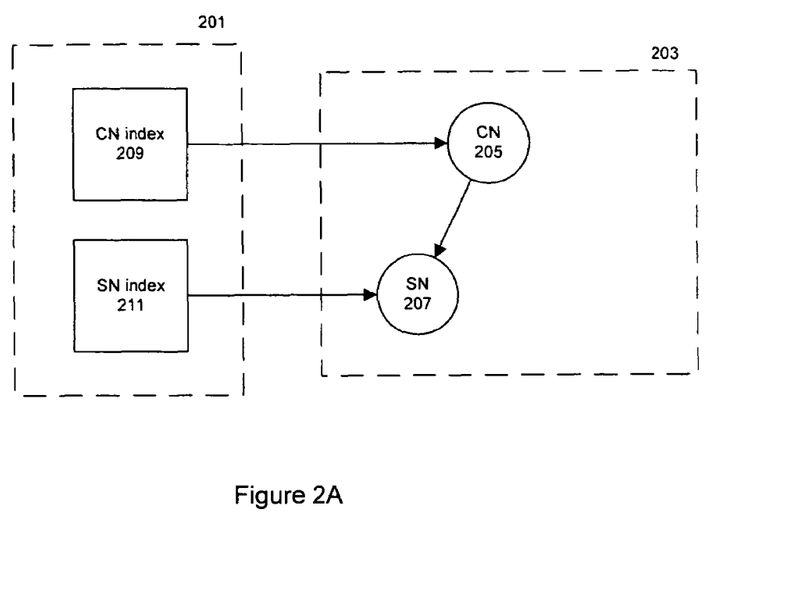
FIGS. 2A and 2B illustrate directory chains containing LDAP attributes that are computed by an virtual attribute service provider such as described in conjunction with FIG. 1.
Figure 2B:
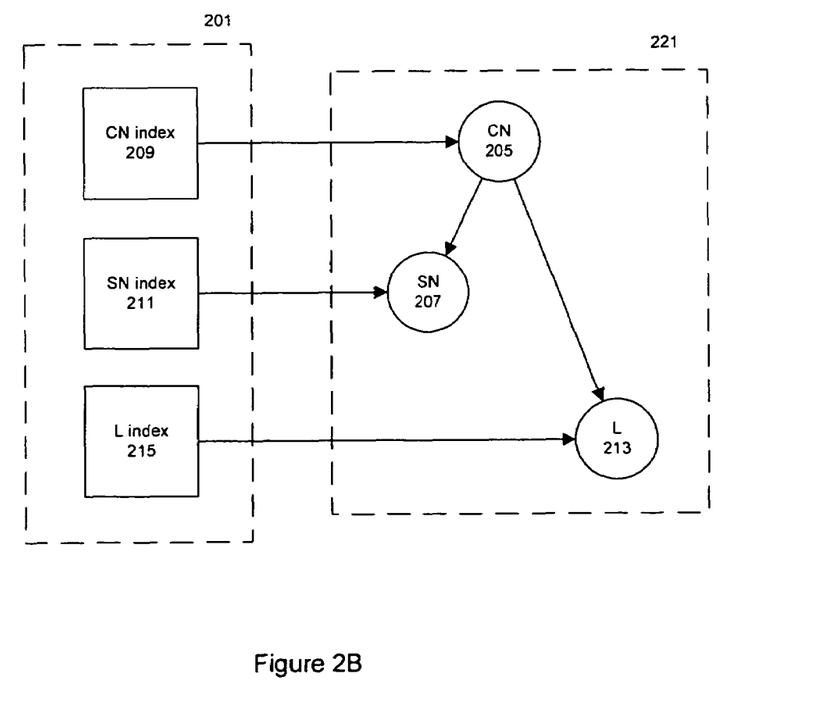

When the directory server 101 is configured, each virtual attribute service provider module, or plugin, 115 registers, with the server 101, the virtual attributes it will compute and a list of attributes that it uses to compute the virtual attributes, i.e., the "parent" attributes of the computed attributes, which may be virtual as well. Typically the server 101 maintains one list per virtual attribute. The list of dependency attributes is used to generate a logical "dependency chain" structure 203, 211 for the virtual attributes as shown in FIGS. 2A and 2B. The dependency chain 203 in FIG. 2A indicates that the value for an attribute SN (surname) is computed from an attribute CN (common name). In one embodiment, the SN plugin searches a CN index 209 to find all the existing CN attribute values to compute the corresponding SN values. The SN plugin also may generate a SN index 211 that contains each SN value and a pointer to the entry that is associated with the SN value. Typically, there is one index per attribute, but an index for complex attributes are also contemplated. For example, a complex attribute may be used in generating dynamic views as described later. In addition, as each plugin 115 registers its virtual attributes, the dependency chains of all existing registered attributes is examined to determine if the dependency chains should be linked.

The resulting dependency chains may be used at run time to determine whether a change made to the LDAP directory 107 requires that one or more of the virtual indices 201 need to be updated. The directory server 101 locates the virtual attribute to be changed in the appropriate index and adds each of its parent attributes (i.e., the attributes from which it is computed) to a list of affected attributes by following the dependency chain until the top (root) node of the dependency chain 203 is reached, at which point, all indices to be updated are on the list. It will be appreciated that any member of a dependency chain may be a member of a different dependency chain so that a single dependency chain may fan out into multiple dependency chains, each of which the server 101 will follow to the root node.

For entry attribute modification after configuration, the directory server 101 accesses each index in the list in turn and updates the value set for the attribute to the new value set calculated by the appropriate plugin 115. The update operation may be performed in real time while blocking a writer query and access to the entry itself in order to make the operation atomic.

Virtual attribute configuration entry modification may affect the values for many attributes over many entries. Beginning at the "leaves" of the dependency chain, each index is queried for the value or values of the attribute contained in the configuration before the change, producing a candidate list of possibly affected entries. The directory server 101 accesses each entry in the index that is also in the list of affected entries and updates the value set for the attribute to the new value set as calculated by the appropriate plugin 115.

In one embodiment, all affected indices in the tree might be taken offline to avoid incorrect query results. An alternative embodiment blocks queries from using the indices until the operation is done. In still another embodiment, the blocking may be configurable and depend on such parameters as the number of indices affected, entries affected, time spent before taking offline versus blocking.

A special case is the virtual attribute that is computed as a result of an attribute value pair that the target entry contains, which is a DN that points to another entry containing the values as illustrated in FIG. 2B. In this example, the location in a employee's entry is calculated to be the same as the location of the employee's boss. Thus L 213 for the employee depends from the CN 205 of the boss because the CN 205 defines part of the DN for the boss. In this case, modifications to both the value of the DN based attribute in the target (employee) entry and the values of the attributes retrieved from the pointed-to (boss) entry are important. The DN for the target entry being changed is taken care of in the normal case. However, when the pointed-to entry changes, special action must be taken to detect this. In this case, on registration the virtual attribute is flagged as a relational attribute and the attribute used for the relation is named explicitly so that when the dependency attributes are changed in any entry, the DN of that entry can be searched to see if it matches the relational attribute of any entry. This processing produces the candidate list of affected entries, which are then processed as described above.

Another, but related special case, is when the relational attribute is recursively relational, i.e., an attribute X is determined by the value of attribute X (or even some other recursive attribute) in the pointed-to entry plus the value of that entry's DN, which itself may be determined by the value of attribute X in its pointed-to entry. In this case, the change methodology would need to process each entry in the chain. This processing can be made faster using virtual recursive attributes as described below in conjunction with FIG. 3B.

Figure 3A:
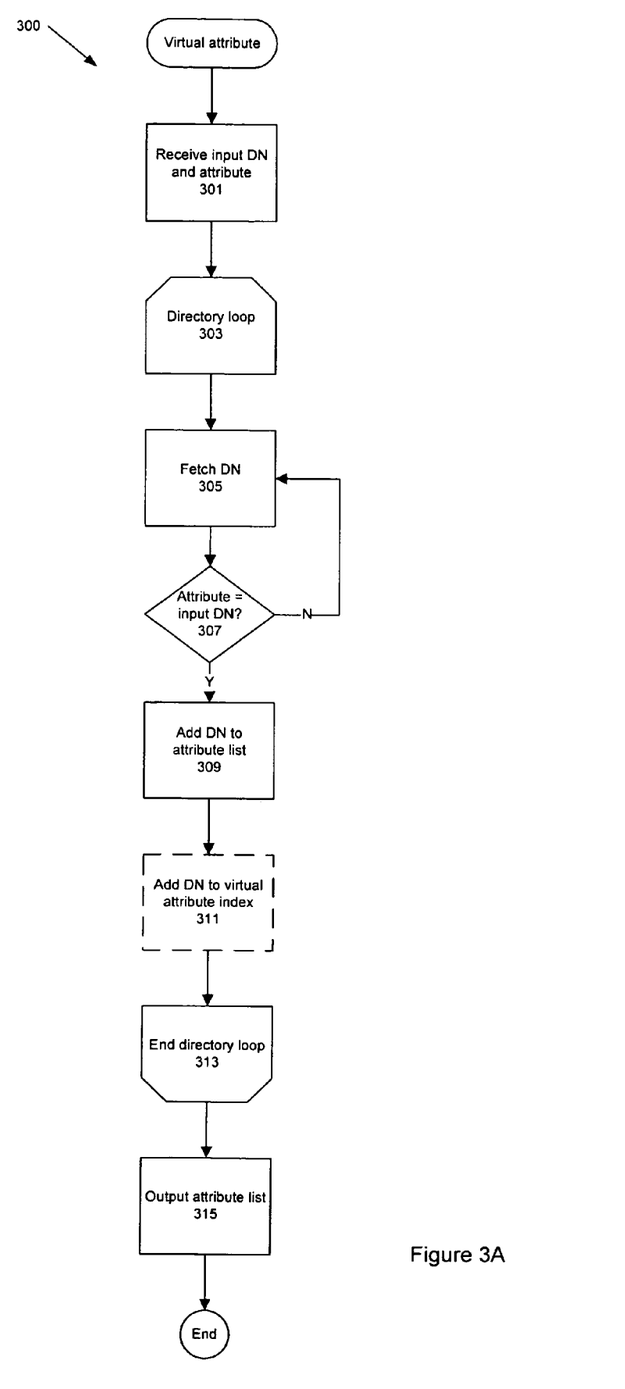
FIGS. 3A-C are flowcharts of methods to be performed by an LDAP virtual attribute service provider such as described in conjunction in FIG. 1.

Turning now to FIG. 3A, one embodiment of a virtual attribute method 300 that is executed by a virtual attribute service provider module 115 is illustrated. To aid in understanding FIG. 3A, assume that the virtual attribute will be a list of DNs of employees who directly report to a certain person, i.e., a "mydirectreports" virtual attribute. The input DN to the method 300 is the DN of the person requesting a list of his/her direct reports and the input attribute is the "manager" attribute that appears in the DN entries of the reporting employees (block 301). The method 300 performs a directory tree loop (block 303), in which each DN in the directory is fetched (block 305). The method 300 may use a virtual attribute index if available at block 305. If the value of the manager attribute in the DN entry is equal to the input DN (block 307), the DN of the entry is added to an attribute list (block 309). The directory loop ends at block 313 when all DN entries have been evaluated. The attribute list is output for subsequent use (block 315), such as for display to a client that requested a list of his/her direct reports. In one embodiment, the resulting attribute list is cached as part of the processing at block 309. In another embodiment, an index is created from the values as they are added to the "mydirectreports" list (block 311, shown in phantom).

Figure 3B:
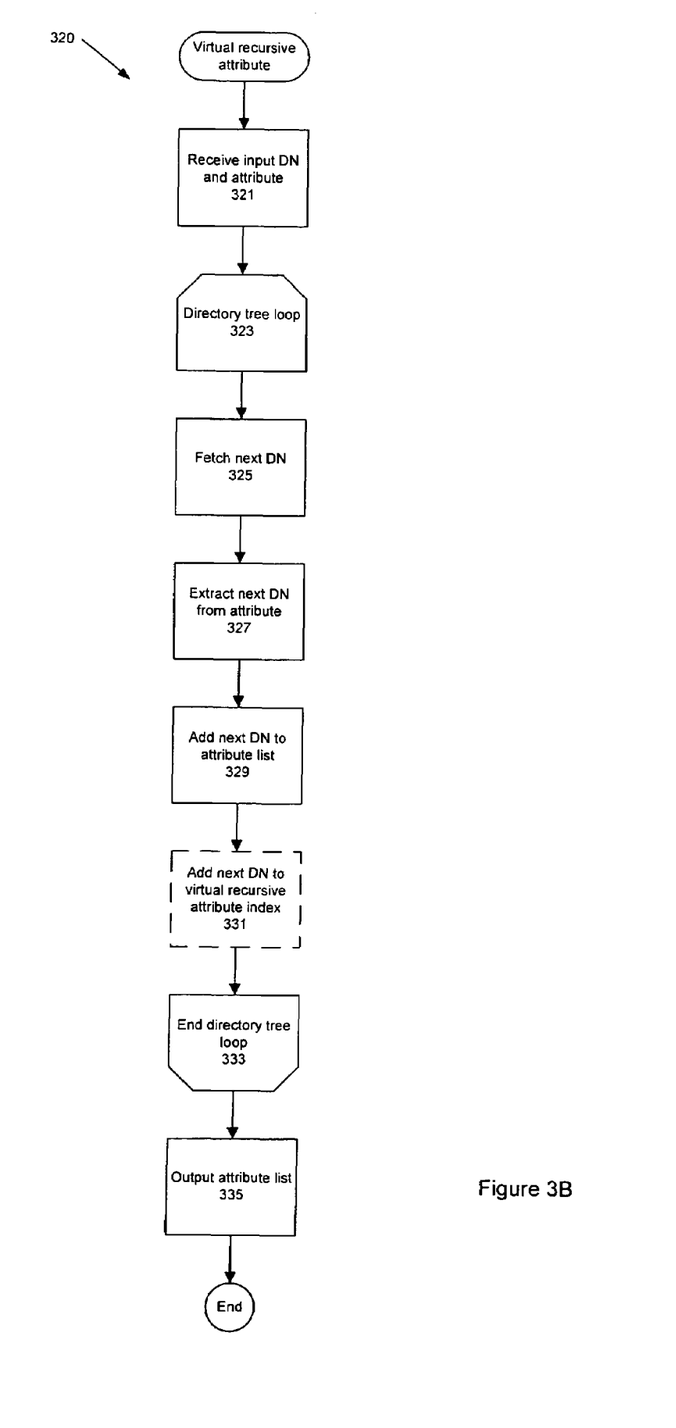

FIG. 3B illustrates one embodiment of a virtual recursive attribute method 320 that is executed by a virtual attribute service provider to process a nested query. In this context, a nested query is one that requires navigating through a directory tree until a particular entry is reached. For example, the method 320 can be used to generate a multivalued virtual attribute called "mybosses," that is a list of all the managers of a particular employee. Accordingly, the input attribute equals "manager" and the input DN entry is that of the employee (block 321). The method 320 performs a directory tree loop (block 323), in which each DN entry in the chain of command above the employee would be fetched (block 325). The next higher DN entry value would be extracted from the manager attribute of the current DN entry (block 327) and added to an attribute list as a value for the "mybosses" virtual attribute (block 329). The loop ends at block 333 when a DN entry is reached that has no manager attribute or for which the manager attribute value is null (blank). The "mybosses" attribute list is output for subsequent use (block 335), such as for display to a client that requests a list of his/her bosses. In one embodiment, the resulting attribute list is cached as part of the processing at block 329. In another embodiment, an index is created from the DN values as they are added to the "mybosses" list (block 331, shown in phantom).

It will be appreciated that the method 320 may be executed on each DN in the directory. In such an embodiment, each entry in the virtual recursive attribute index contains a unique value for the virtual recursive attribute and a list of DN values that are associated with the index. This index can then be used to process standard nested queries more quickly.

Figure 3C:
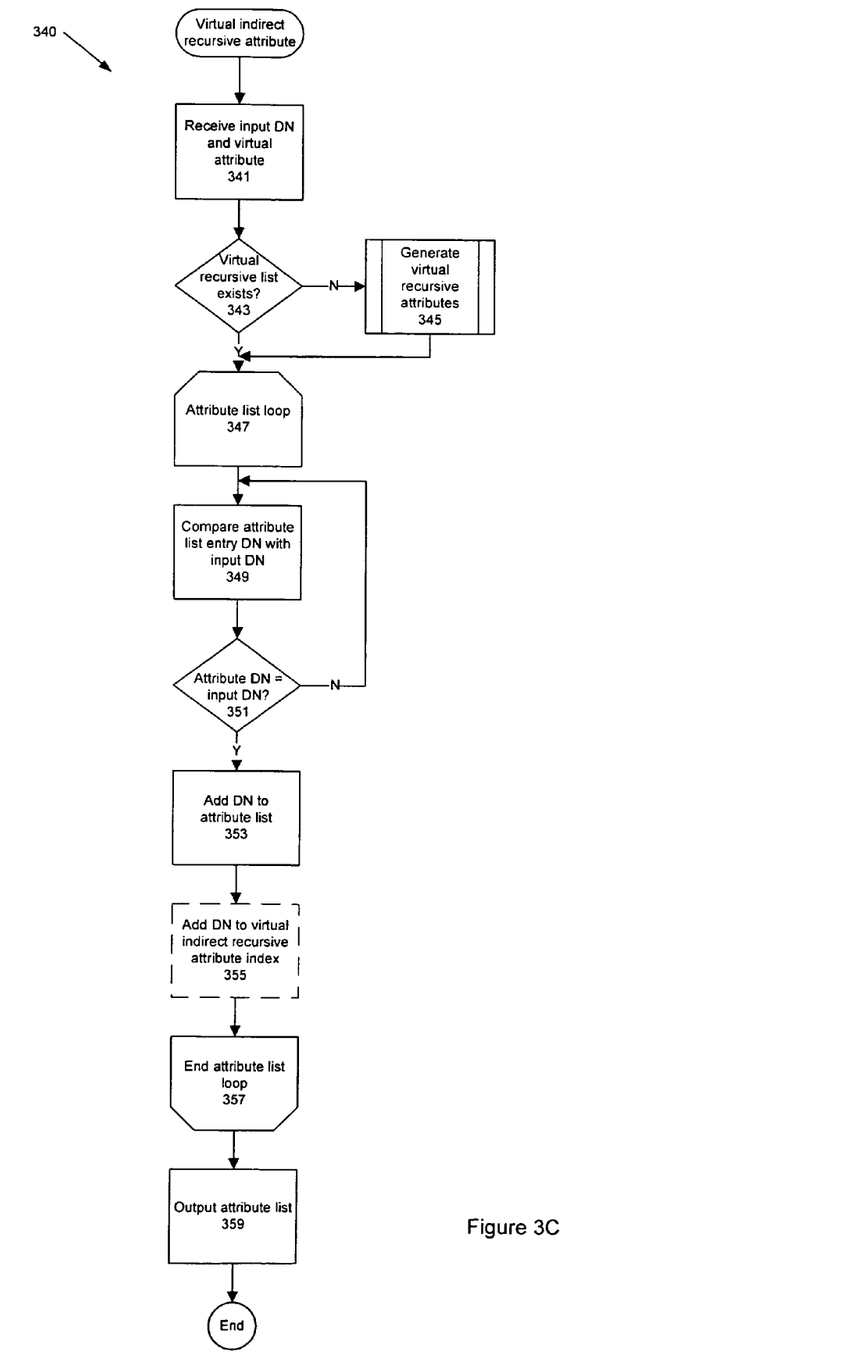

A method 340 in FIG. 3C is one embodiment of a process that creates a virtual indirect attribute for an input DN entry. For example, the method 340 can be used to generate a multivalued virtual attribute called "myreports" that is a list of all employees that directly or indirectly report to the person represented by the input DN entry. In this case, the input attribute is the virtual recursive attribute "mybosses" (block 341). If the virtual attribute "mybosses" does not already exist (block 343), it is created for all DN entries at block 345 as described above. The method 340 performs an attribute list loop (block 347), in which the value of the mybosses attribute for each list entry is compared with the input DN (block 349). If the attribute value is equal to the input DN (block 351), the DN associated with the attribute is added to an attribute list as a value for the "myreports" virtual attribute (block 353). The loop ends at block 357 when all entries in the virtual reverse attribute list have been examined. The "myreports" list is output for subsequent use (block 359), such as for display to a client that requests a list of his/her reports. In one embodiment, the resulting attribute list is cached as part of the processing at block 353. In another embodiment, an index is created from the values as they are added to the "myreports" list (block 357, shown in phantom).

It will be appreciated that method 340 generates the inverse of the virtual attributes generated by the method of 320 so the virtual indirect recursive attributes may also be referred to as virtual reverse attributes. Together, the sets of virtual attributes generated by methods 320, 340 can be envisioned as forming a bidirectional graph of the portions of the directory for which the virtual attributes have been generated. Thus, the indices of virtual recursive and reverse attributes may be used to more quickly process nested queries, such as "Give me the names of everyone in John Doe's organization." In addition, the indices of virtual recursive and reverse attributes may be pregenerated for common nested queries to enable faster response times.

While the virtual recursive and virtual reverse attributes have been described in terms of their use in responding to nested queries, they also can be used to define dynamic groups based on some common group attribute. Examples of such use include calendar groups, and access control lists (ACLs). Other servers also may use the virtual attributes. For example, a mail server could resolve a mailing list attribute into a list of email addresses by querying the LDAP server. Assume the value of the mailing list attribute is janesmith-directs@sample.com. If the user jane.smith@sample.com exists in the LDAP directory, the mail server would request a list the email addresses of all of Jane Smith's direct reports from the LDAP server, i.e., those defined by the virtual attribute "mydirectreports" with the value "janesmith" as explained above in conjunction with FIG. 3A. Similarly, a mailing list attribute with the value janesmith-staff@sample.com, could be resolved using the "myreports" attributes as explained above in conjunction with FIG. 3C.

The term "virtual attribute" is used herein to mean any attribute that is calculated from one or more LDAP attributes, either real or virtual, as described in conjunction with FIGS. 2A-B and 3A-C above. In addition, the term "virtual attribute" also refers to LDAP attributes that do not correspond to objects in the LDAP schema, as well as to those that do.

Figure 1:
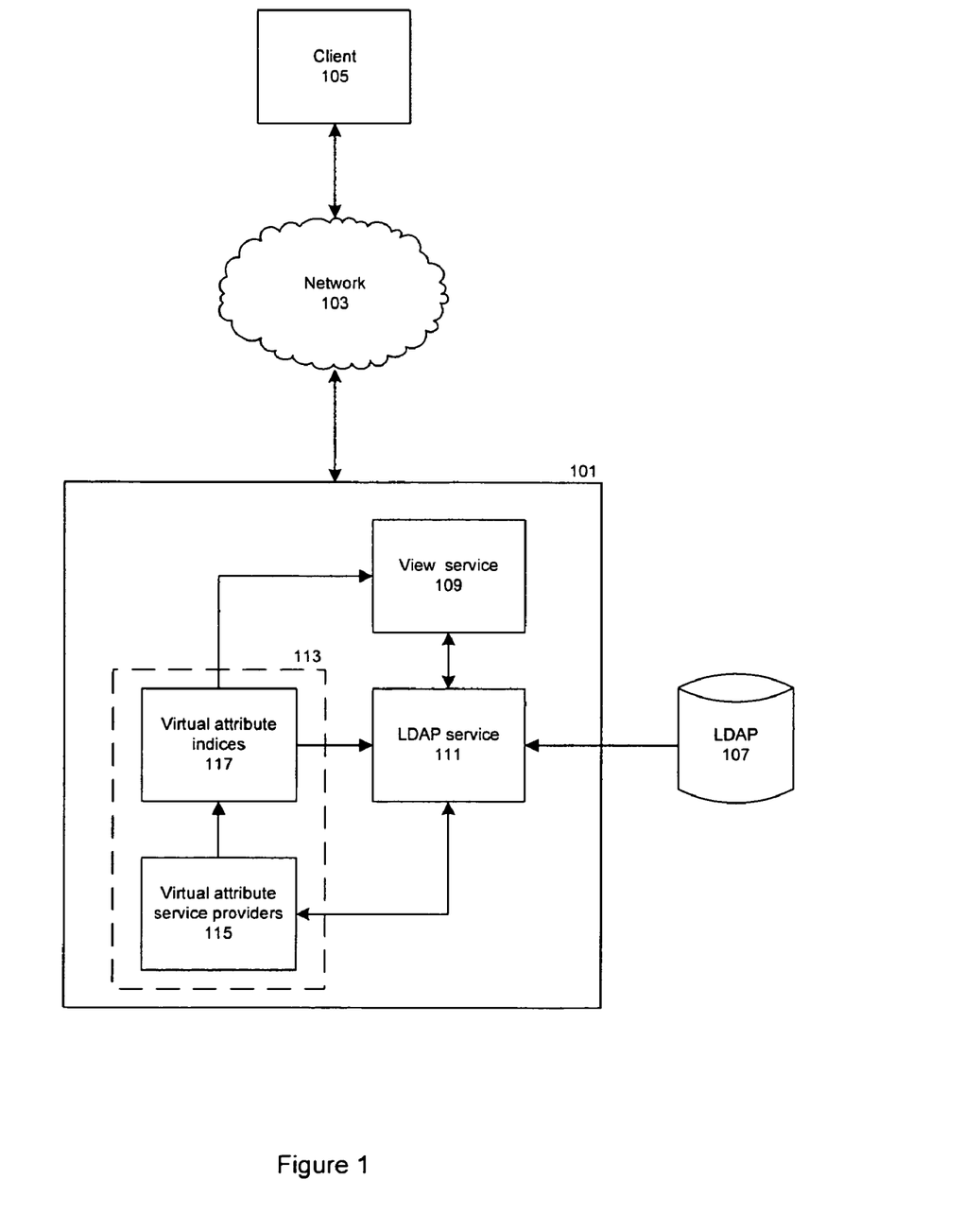
FIG. 1 is a diagram illustrating a system-level overview of an embodiment of the invention.
Figure 4:
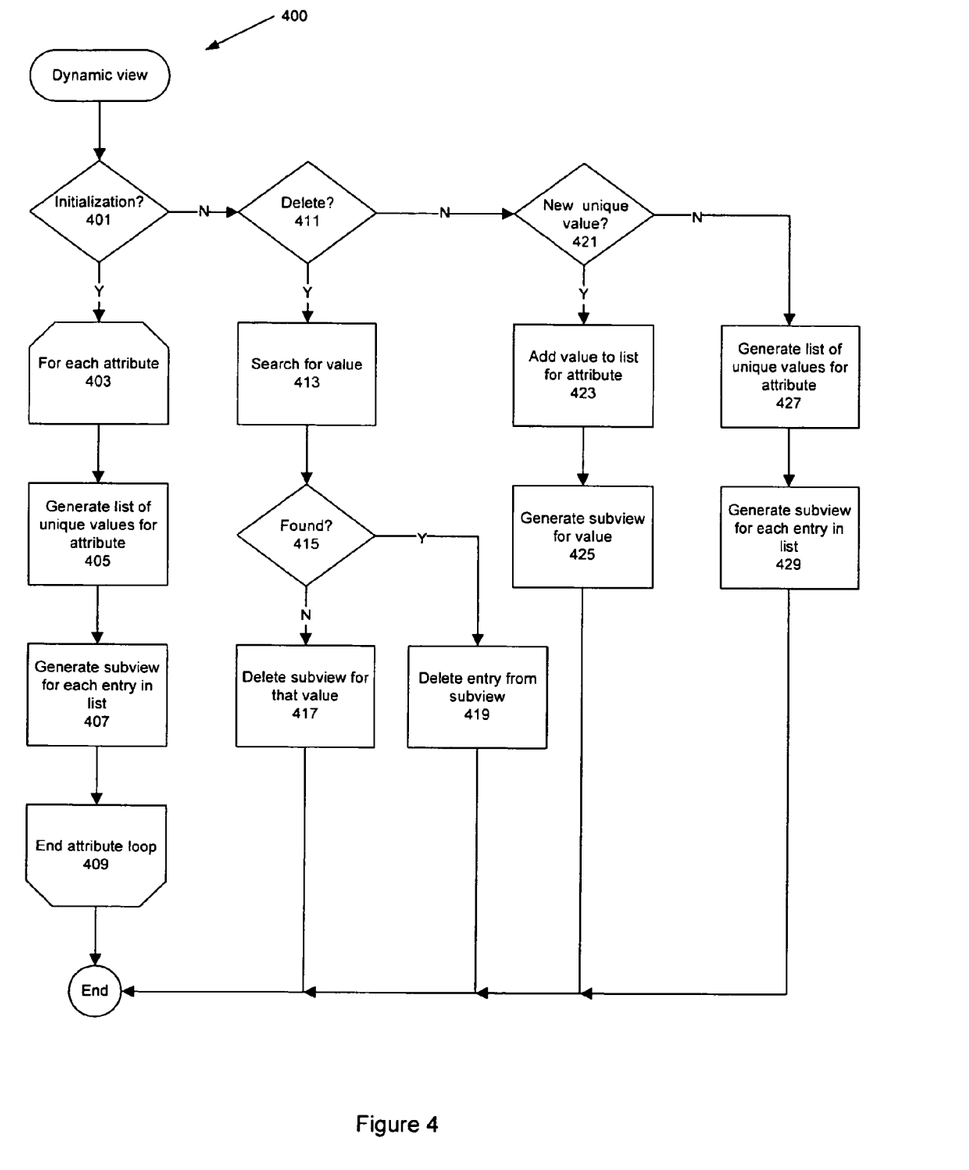
FIGS. 4, 5 and 6 are flowcharts of methods to be performed by an LDAP view service such as described in conjunction with FIG. 1.

Turning now to FIG. 4, one embodiment of a method 400 that is executed by a view service within a directory server, such as view services module 109 within directory server 101 of FIG. 1, is described. Views are subsets of the directory tree created by eliminating unwanted DN entries from the output based on some filtering criteria. The requested view is typically displayed to a client as a logical hierarchical tree. Dynamic views allow a directory server to generate different views of an LDAP directory without having to maintain a static structure for each view in the DIT.

The embodiment of FIG. 4 presupposes that the desired attribute on which to filter the DN entries has been defined within the LDAP schema by an administrator. At initialization of the directory server (block 401), the method 400 performs a processing loop (from block 403 until block 409) that creates a list of unique values for the attribute (block 405). A subview is created for each of the unique values (block 407). In one embodiment, the subview is a list of all DN entries that contain the unique value. In an alternate embodiment, each subview list forms an entry in an index for the view. INote that if the attribute is multivalued, the same DN may appear in multiple subviews. In yet another embodiment, if a dynamic view is defined with a list of attribute types, the position of an attribute type within in the list determines the level in the dynamic view at which the corresponding subview will appear. Thus, the top level dynamic view contains an attribute that contains a list of values in some format, e.g., type1, type2, type3, which determine the standard subview levels that will be created for the dynamic view, e.g., the type1 subview at the first level, the type2 subview at the second level, and the type3 subview at the third level. For example, when the dynamic view is defined with single attribute type, such as "dynamicview: l," if the location attribute values are "sunnyvale" and "mountain view," a dynamic view with two subviews is created:

o=root
      l=sunnyvale
      l=mountain view.

Whereas, if the dynamic view is defined with a list of attribute types, such as "dynamicview: l, department, office," a cascading subview hierarchy is created:

o=root
      l=sunnyvale
         department=law
            office=building1
         department=engineering
            office=building1
            office=building2
      l=mountain view
         department=law
            office=building1
         department=engineering
            office=building1.

The hierarchical tree view is subsequently created from the subview list using the currently known methodologies that generate static views.

Furthermore, the method 400 is invoked by the directory server when one of the values for the attribute changes. If the value is deleted (block 411), the method 400 searches the appropriate subview list to determine if there is only one DN entry in the list (block 415). If so, the subview is deleted because there will be no more DN entries with the original value (block 417). If not, the corresponding DN entry is deleted from the subview list (block 419).

If a new unique value is added (block 421), the method 400 adds the value to the list of unique values for the corresponding attribute (block 423) and creates a subview for the new unique value (block 425).

Is some cases, a new attribute may be defined after initialization. Similar to the process represented at blocks 405 and 407 for adding attributes during initialization, the method 400 will generate a list of unique values for the new attribute (block 427) and the appropriate subviews (block 429). For example, if a new attribute is defined that specifies filtering on the location attribute, the method 400 will generate a list of unique location values and create a subview for each location in the list.

Figure 5:
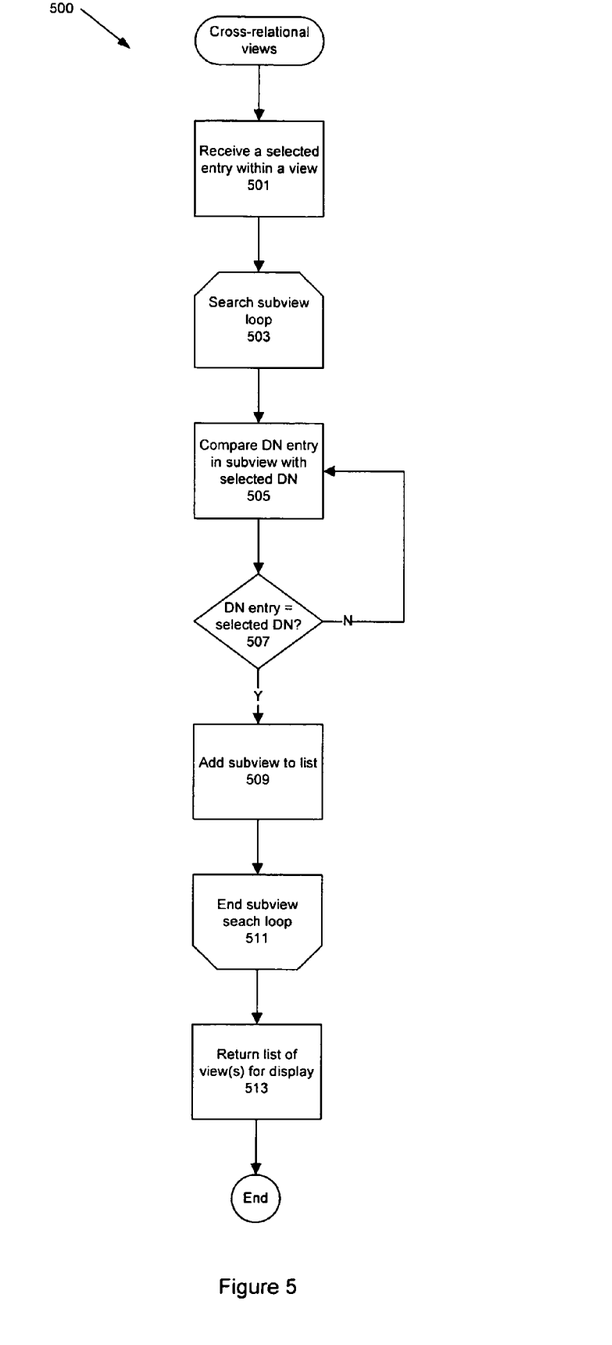

The dynamic views created by method 400 may be used to generate cross-relational views as described next in conjunction with FIG. 5. The method 500 allows a client to select a DN entry in one hierarchical tree view and see a different hierarchical tree view for the selected DN. For example, an employee works on a sub-project that is part of a larger project, which is, in turn, a component of a product. Thus, the employee belongs to three different tree views, the sub-project, the project and the product, which may be displayed to the client if requested.

Method 500 receives the selected DN (block 501) and searches the subview lists (block 503 until block 511). The DN entries for each subview list are examined (block 505). If any DN entry matches the selected DN (block 507), the subview is added to a list (block 509). When all subview lists have been examined (block 511), a list of view(s) corresponding to the sublists are returned for display to the client (block 513). It will be appreciated that the hierarchical tree view subsequently may be created using the subview list that corresponds to a selected one of the entries in the view list as described previously.

Figure 6:
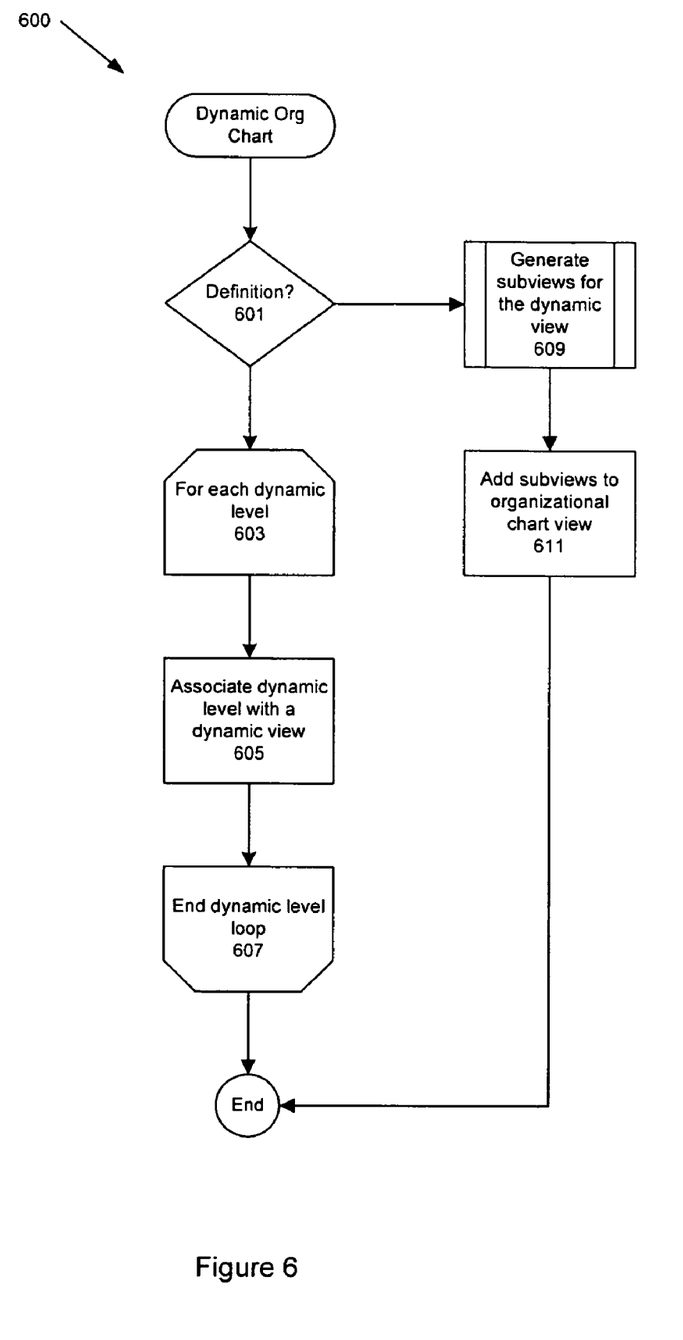

In addition, it is fairly common to derive organizational charts from the DN entries in an LDAP directory, in which each level in an organizational chart corresponds to a real DN attribute. However, the LDAP administrator may define organizational chart levels in the schema as associated with dynamic views to provide a dynamic organizational chart as illustrated in FIG. 6. Essentially, the organization chart becomes a view that contains nested dynamic views. Method 600 is invoked by the view service to define and generate the dynamic levels of the organization chart. For definition (block 601), method 600 performs a processing loop (block 603 through 607) for each dynamic level in which the dynamic level is associated with a dynamic view (block 605). When the organizational chart is to be generated, the method 600 invokes method 600 to generate the subviews for the dynamic views (block 609). The resulting subviews are added to the organizational chart view (block 611). It will be appreciated that the non-dynamic levels for the organizational view may be created using standard methodologies.

In practice, the methods 300, 320, 340, 400, 500 and 600 may constitute one or more programs made up of machine-executable instructions. Describing the method with reference to the flowcharts in FIGS. 3A-C, 4, 5 and 6 enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the method illustrated in the Figures without departing from the scope of the invention and that no particular order is implied by the arrangement of blocks shown and described herein.

Figure 7A:
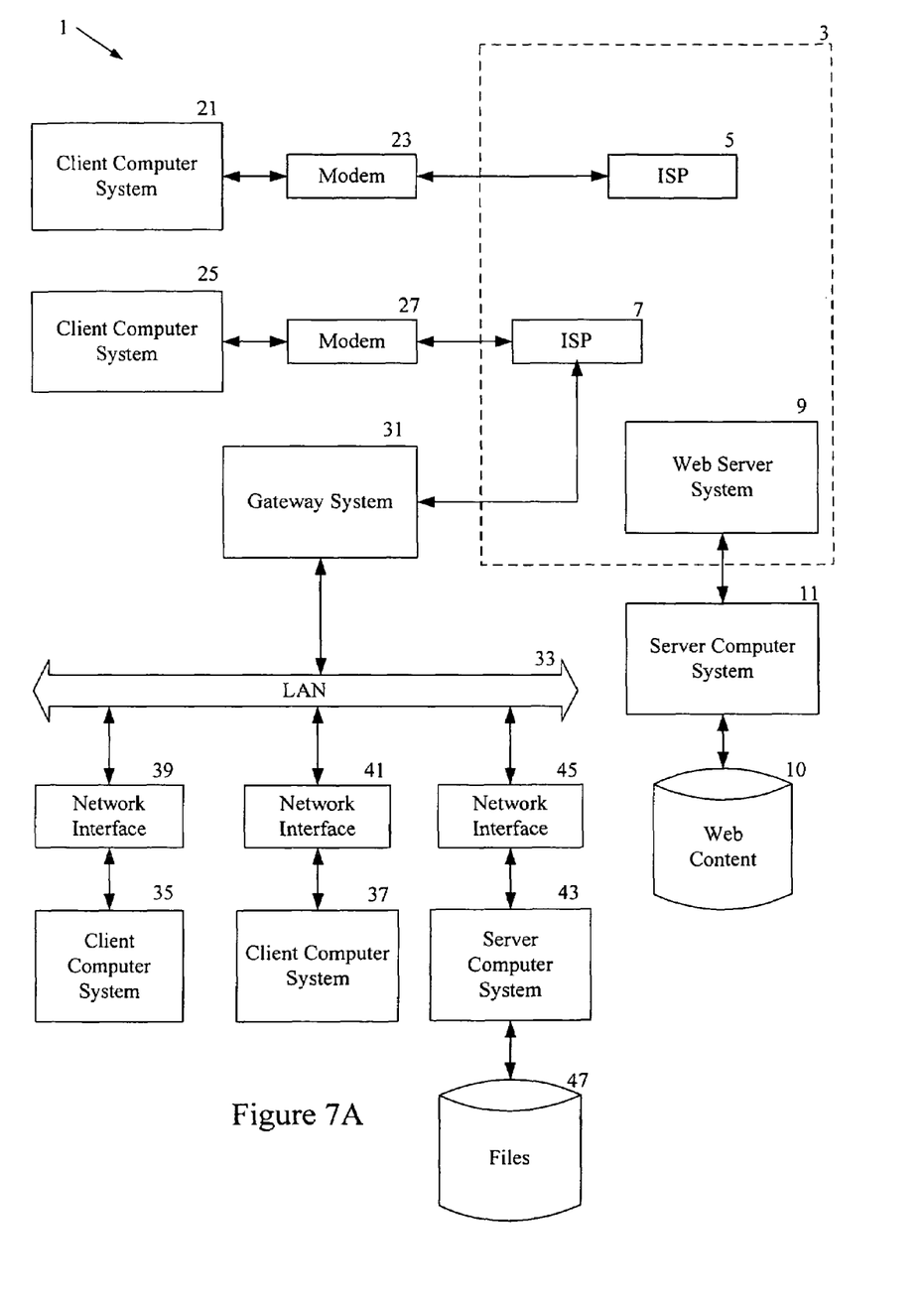
FIG. 7A is a diagram of one embodiment of an operating environment suitable for practicing the present invention.
Figure 7B:
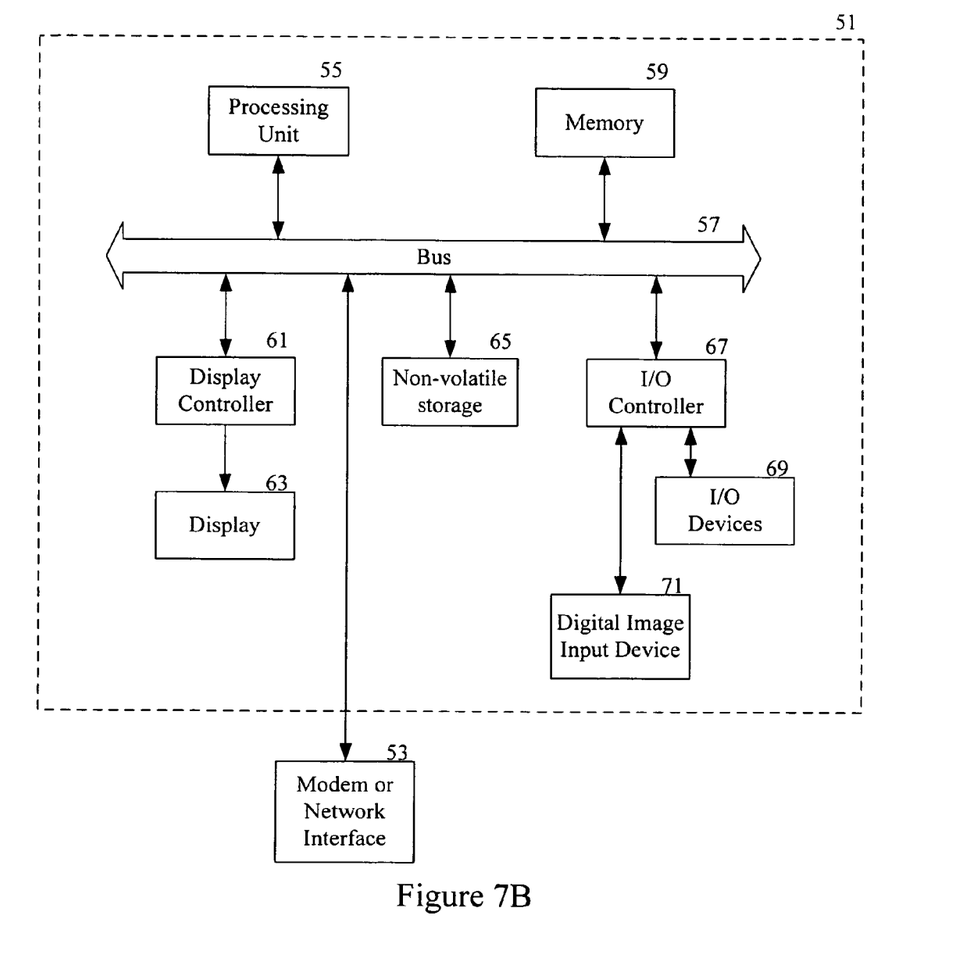
FIG. 7B is a diagram of one embodiment of a computer system suitable for use in the operating environment of FIG. 7A.

The following description of FIGS. 7A-B is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 7A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 7A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 7A, the connections are not the same for these three computer systems. Client computer system 25 is coupled through a modem interface 27 while client computer systems 35 and 37 are part of a LAN. While FIG. 7A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31. Furthermore, any combination of client systems 21, 25, 35, 37 may be connected together in a peer-to-peer network using LAN 33, Internet 3 or a combination as a communications medium. The communications medium also encompasses a carrier wave that encodes a data signal for transmission. Generally, a peer-to-peer network distributes data across a network of multiple machines for storage and retrieval without the use of a central server or servers. Thus, each peer network node may incorporate the functions of both the client and the server described above.

FIG. 7B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the embodiments of the present invention. Network computers do not usually include a hard disk or other mass storage, and the executable programs are loaded from a network connection into the memory 59 for execution by the processor 55. A Web TV system, which is known in the art, is also considered to be a computer system according to the embodiments of the present invention, but it may lack some of the features shown in FIG. 7B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Although the invention as been described with reference to specific embodiments illustrated herein, this description is not intended to be construed in a limiting sense. It will be appreciated by those of ordinary skill in the art that any arrangement which is calculated to achieve the same purpose may be substituted for the specific embodiments shown and is deemed to lie within the scope of the invention.

In addition, one of skill will recognize that references to lists, indices, and like, are intended to cover all types of data structures that utilize logical pointers to locate entries in an LDAP directory.

Accordingly, this application is intended to cover any such adaptations or variations of the present invention. Therefore, it is manifestly intended that this invention be limited only by the following claims and equivalents thereof.

What is claimed is:

1. A method comprising:
    receiving an input virtual recursive attribute and an input value for a distinguished name (DN) entry, wherein the DN entry corresponds to an object defined in a schema for a lightweight directory access protocol (LDAP) directory, and wherein the input virtual recursive attribute does not correspond to an object defined in the schema because a value of the input virtual recursive attribute is determined by the value of an entry to which the input virtual recursive attribute points plus a value of a DN of the pointed-to entry; and
    generating an attribute list that defines values for an inverse of the input virtual recursive attribute by:
        navigating through a list of DN values for the input virtual recursive attribute; and
        adding a DN value from the list as an entry in the attribute list if the DN value in the list matches the input value;
    wherein the virtual recursive attribute and the inverse of the virtual recursive attribute form a bidirectional graph of a portion of the LDAP directory for which the virtual recursive attribute has been generated.

2. The method of claim 1 further comprising:
outputting the attribute list as a response to a query that specifies the input virtual recursive attribute and the input value for the DN entry.

3. The method of claim 1 further comprising:
caching the attribute list.

4. The method of claim 1 further comprising:
generating an index for the entries in the attribute list.

5. The method of claim 1 further comprising:
generating the list of DN values for the input virtual recursive attribute.

6. The method of claim 1, wherein the list of DN values is indexed.

7. The method of claim 1, wherein an attribute list is created for each value of the virtual recursive attribute.

8. A computer-readable storage medium having executable instructions to cause a processor to perform a process comprising:
    receiving an input virtual recursive attribute and an input value for a distinguished name (DN) entry, wherein the DN entry corresponds to an object defined in a schema for a lightweight directory access protocol (LDAP) directory, and wherein the input virtual recursive attribute does not correspond to an object defined in the schema because a value of the input virtual recursive attribute is determined by the value of an entry to which the input virtual recursive attribute points plus a value of a DN of the pointed-to entry; and
    generating an attribute list that defines values for an inverse of the input virtual recursive attribute by:
        navigating through a list of DN values for the input virtual recursive attribute; and
        adding a DN value from the list as an entry in the attribute list if the DN value in the list matches the input value;
    wherein the virtual recursive attribute and the inverse of the virtual recursive attribute form a bidirectional graph of a portion of the LDAP directory for which the virtual recursive attribute has been generated.

9. The computer-readable storage medium of claim 8, wherein the process further comprises:
outputting the attribute list as a response to a query that specifies the input virtual recursive attribute and the input value for the DN entry.

10. The computer-readable storage medium of claim 8, wherein the process further comprises:
caching the attribute list.

11. The computer-readable storage medium of claim 8, wherein the process further comprises:
generating an index for the entries in the attribute list.

12. The computer-readable storage medium of claim 8, wherein the process further comprises:
generating the list of DN values for the input virtual recursive attribute.

13. The computer-readable storage medium of claim 8, wherein the list of DN values is indexed.

14. The computer-readable storage medium of claim 8, wherein an attribute list is created for each value of the virtual recursive attribute.

15. A computer system comprising:
    a processor coupled to a memory through a bus; and
    instructions executed from the memory by the processor to cause the processor to perform a process comprising:
    receiving an input virtual recursive attribute and an input value for a distinguished name (DN) entry, wherein the DN entry corresponds to an object defined in a schema for a lightweight directory access protocol (LDAP) directory, and wherein the input virtual recursive attribute does not correspond to an object defined in the schema because a value of the input virtual recursive attribute is determined by the value of an entry to which the input virtual recursive attribute points plus a value of a DN of the pointed-to entry; and
    generating an attribute list that defines values for an inverse of the input virtual recursive attribute by:
        navigating through a list of DN values for the input virtual recursive attribute; and
        adding a DN value from the list as an entry in the attribute list if the DN value in the list matches the input value;
    wherein the virtual recursive attribute and the inverse of the virtual recursive attribute form a bidirectional graph of a portion of the LDAP directory for which the virtual recursive attribute has been generated.

16. The computer system of claim 15, wherein the process further comprises:
outputting the attribute list as a response to a query that specifies the input virtual recursive attribute and the input value for the DN entry.

17. The computer system of claim 15, wherein the process further comprises:
caching the attribute list.

18. The computer system of claim 15, wherein the process further comprises:
generating an index for the entries in the attribute list.

19. The computer system of claim 15, wherein the process further comprises:
generating the list of DN values for the input virtual recursive attribute.

20. The computer system of claim 15, wherein the list of DN values is indexed.

21. The computer system of claim 15, wherein an attribute list is created for each value of the virtual recursive attribute.

22. An apparatus comprising:
means for receiving an input virtual recursive attribute and an input value for a distinguished name (DN) entry, wherein the DN entry corresponds to an object defined in a schema for a lightweight directory access protocol (LDAP) directory, and wherein the input virtual recursive attribute does not correspond to an object defined in the schema because a value of the input virtual recursive attribute is determined by the value of an entry to which the input virtual recursive attribute points plus a value of a DN of the pointed-to entry; and
means for generating an attribute list that defines values for an inverse of the input virtual recursive attribute by:
navigating through a list of DN values for the input virtual recursive attribute; and
adding a DN value from the list as an entry in the attribute list if the DN value in the list matches the input value;
wherein the virtual recursive attribute and the inverse of the virtual recursive attribute form a bidirectional graph of a portion of the LDAP directory for which the virtual recursive attribute has been generated.

23. The apparatus of claim 22, wherein the means for generating further caches the attribute list.

24. The apparatus of claim 22, wherein the means for generating further generates an index for the entries in the attribute list.

* * * * *